Patented July 7, 1931

1,813,882

UNITED STATES PATENT OFFICE

HOMER BEHM, OF CHICAGO, ILLINOIS

PROCESS OF TREATING MINERAL OIL MATERIAL

No Drawing. Application filed July 14, 1922, Serial No. 575,040. Renewed June 3, 1931.

This invention relates to a process of improving petroleum oils including gasoline but more especially those oils heavier than gasoline, to cause them to serve as a motor fuel instead of gasoline in internal combustion engines and to improve these oils for burning purposes and for the manufacture of gas and for other purposes hereinafter mentioned.

It has heretofore been proposed to crack those portions of petroleum, less volatile than gasoline, to make substitutes for the gasoline distillate of petroleum. In the present invention, the oil is not subjected to such high heat treatment, but is subjected, at far lower temperatures preferably at atmospheric temperature, say at 60 to 100° F., to the action of a herein defined fermentation process. Kerosene, so, treated, can be used mixed in large proportions with gasoline, as a motor fuel, and it can be used as a substitute for turpentine, varnish maker's solvent, and for other purposes.

First I prepare a decomposed oil or "starter", to be added (in small amounts) to the oil to be treated, for example as follows:

Example

In a tank containing a petroleum oil, for example, kerosene, to each five gallons of the oil I add, 1 quart of slaked lime, 1 pint of ground rosin, ½ pint of a solution of formaldehyde (e. g., a 40% solution) and 4 fluid ounces of a strong aqua ammonia, cover the tank and allow to stand for at least 24 hours, then filter and heat up to slightly above high atmospheric temperature (say up to 110 or 120° F.) and then add 8 fluid ounces of turpentine.

The product (before the addition of the turpentine) I believe to be a decomposed kerosene, this decomposition being brought about by the reaction within the oil, of the chemicals added. These reactions appear to be rather complicated, but they seem to have the effect of decomposing the oil. This decomposition is proven by the fact that the initial boiling point and the end boiling point of the oil are substantially lowered as proven by actual distillation tests on the initial kerosene and on this product. The distillation curve of this product is roughly parallel to that of the initial kerosene, but is about 40 to 50° lower (Fahrenheit scale) at all points. The addition of turpentine to the mixture at this stage causes the ingredients of the mixture to blend more perfectly. It is a well known fact that turpentine has the power of causing oxygen to unite with substances to which it is added and the addition of turpentine to the liquid mixture at relatively high temperatures, in this case, affording means for causing affixation of oxygen to the mixture.

To the oils to be treated, add about one part by volume of the starter, to four hundred parts by volume of kerosene or other heavier oils to be treated, and this will cause fermentation to commence, after adding about 2% of alcohol to the mixture. When the alcohol is added, the mixture is agitated and aerated, preferably with air. The mixture during such aeration treatment becomes turbid, and remains so, the turbidity increasing during the fermentation treatment. Oxidizing bacteria and other ferment organisms appear to be formed and multiplied therein, in a manner somewhat similar to the action of ferment organisms causing the oxidation of alcohol in the process of making vinegar therefrom. The temperature maintained during this part of the process is preferably about ordinary room temperature, say from 60° up to 105° F. In addition to the alcohol, water is also preferably added, say in amount of 1 to 2%.

During this entire treatment, the mixture of kerosene and other materials is in contact with air, and air may be forced through the mixture, either continuously or intermittently, throughout such treatment. The mixture can be subjected to aeration in various other ways, similar to those used in the manufacture of vinegar, either continuously or intermittently, during the process.

The fermentation seems to be initiated by the addition to the kerosene under treatment, of the decomposed oil above referred to, in combination with the addition of small amounts of alcohol and water, and in combination with the step of aeration. It is to be understood that the decomposed oil does not itself contain any bacterial growth. The starter contains oxygen in available form and furnishes sufficient oxygen to the oil to start some slight oxidation in the oil to which it is added, rendering the oil sensitive to the absorption of oxygen from the air. The addition of alcohol and water in the small amounts in which they are added, facilitates this absorption of oxygen, and furnishes moisture. Oxidizing bacteria present in the air, commence to grow and thrive in the oil undergoing treatment, and carry on the process of adding oxygen to the oil. These germs, (or organisms producing fermentation) in the present case, seem to come from the air introduced in the aeration treatment.

After having continued, the aeration for several days, a small amount of acetic acid (say 1% or less) is added to the mixture, to make the liquid very slightly acid. The liquid during the aeration treatment should be left very slightly alkaline (preferably).

The entire mass of liquid is then heated (preferably slowly) for example, up to 175 to 212° F. The liquid is somewhat acid at this point, and has an odor somewhat resembling vinegar. The liquid, during this heating and subsequent cooling will have settled into two layers. The upper (oily) layer is drawn off. To neutralize the slight acidity of the oil at this stage, it is advisable to add a small amount of slaked lime, 0.2 to 1% may be used, which will ordinarily be entirely sufficient for this purpose. The lower layer (aqueous layer) is referred to hereinafter as "residue of fermentation".

The process is not limited to the use of the exact substances above referred to, various other substances can be added, in place of those above given, for conditioning the oil for the fermentation treatment, and for the further carrying on of the process.

This product is now ready for blending with lighter fractions of petroleum for use as motor fuel. It can also be used with or without blending with lighter fractions of petroleum with engines equipped with carburetors suitable for use of heavier fuels. It is itself a superior fuel for tractors. The odor and exhaust vapor from this treated kerosene are no more objectionable than the odor and exhaust vapor from engines using gasoline. This treated kerosene and other oils before mentioned treated in like manner are far superior to ordinary kerosene for motor fuel in internal combustion engines, makes a more perfect blend with gasoline of all grades, and when mixed half and half with gasoline makes an ideal fuel for automobile engines and other like motors. It is more economical than gasoline, giving an increased mileage per gallon, makes the heavier fractions of petroleum available for use in ordinary engines without expensive equipment or large manufacturing costs. It does not smoke when used in a motor, does not cause the motor to unduly heat up, does not knock, and leaves no carbon. Gasoline will respond to this process and in the same respects becomes superior to ordinary gasoline and leaves no carbon in the motor. The use of this fuel has been shown to remove deposits of carbon from engines.

Kerosene treated in this manner even without the addition of gasoline makes an excellent varnish maker's and painter's naphtha or turpentine substitute.

Gas oil treated by my process can be used with gasoline as a fuel for internal combustion engines and without gasoline is an improved fuel for Diesel engines and wherever the type of engine permits the use of heavier fuels. Gas oil so treated, is also superior to ordinary gas oil for use in the manufacture of gas for domestic and industrial purposes.

Fuel oil treated by my process is less subject to congealing at low temperatures, is an improved fuel for Diesel engines or for burning to produce heat.

Petroleum oils subjected to my process respond more completely to "cracking operations", gerater percentages distilling over after cracking at any given temperature than with oils not so treated.

Petroleum oils undergoing this process absorb oxygen and such treated oils give more complete combustion.

The "residue of fermentation", after filtration to remove the glutinous mass of bacteria or other ferments, is a thin, watery liquid of value. without the separation of its ingredients to use in laundries as a sour and for use as an anti-freeze compound in automobile radiators after neutralizing the acidity with lime and is in some cases valuable for thinning shellac after such residue has been neutralized with whiting.

My process can be carried out in closed or open tanks with or without mechanical or air agitation; with or without continuous circulation of air, with or without circulation of the oil itself. The oil of course should be well contacted with air or aerated, to cause growth of the bacteria. The process is subject to practically the same variations as to time, method, equipment and temperature as obtain in the many and various ways used or generally known for the manufacture of vinegar and other fermented products. The process is not confined to the use of the formula or "starter" herein disclosed. The main object is to produce fermentation and oxidation by means of ferment organisms.

In the process ferment organisms capable of producing oxidation are formed, and multiplied in the oil. They oxidize the fermenting oils. The liquid is turbid during the process and may be clear when it is completed. Throughout the process fermentation can be heightened by adding dilute alcohol, water or other suitable chemicals. Agitation, circulation of oil or air, proper temperatures, character of containers or equipment are incidental to the process and no special or particular mode of operation is claimed. The method here described for the carrying on of the process with materials and proportions used as herein set forth is for the purpose of illustration only.

In this specification, the term "mineral oil material" is used to embrace all of the oils and distillates of petroleum and other analogous hydrocarbon oils of like nature.

In the present case, no claim is made on the starting material or decomposed oil above described, this starting material or decomposed oil being described and claimed in my copending application Serial No. 611,663, filed January 9, 1923.

In this specification and the appended claims, the term "bacteria" and the term "ferment organisms" are intended to embrace various forms of organisms in which enzymes are present and active, and the term "fermentation" is intended to embrace any action producing a change in the oil, produced solely or in part by the action of such enzymes or organisms.

What I claim as my invention or discovery is:

1. A process which comprises forming a mixture by adding to a petroleum oil material, slaked lime, rosin, formaldehyde, and ammonia, allowing to stand, and adding turpentine, thereafter adding such mixture to a much larger volume of petroleum oil material, adding alcohol and water, and allowing protracted contact of the mixture with air, such operations being performed at about atmospheric temperature.

2. A process which comprises forming a mixture by adding to kerosene, slaked lime, rosin, formaldehyde and ammonia, allowing to stand, and adding turpentine, thereafter adding such mixture to a much larger volume of kerosene, adding alcohol and water, and allowing protracted contact of the mixture with air, such operations being performed at about atmospheric temperature.

3. A process which comprises aerating for a period of several days, at a temperature not far from 60 to 105° F., a mixture comprising small amounts of the reaction product of lime and rosin, turpentine, water, and alcohol together with a large amount of a mineral oil material.

4. A process which comprises aerating for a period of several days, at a temperature not far from 60 to 105° F., a mixture comprising small amounts of the reaction product of lime and rosin, turpentine, water and alcohol, together with a far greater quantity of a mineral oil material, while such mixture contains ferment organisms.

5. A process which comprises subjecting petroleum oil material, while associated with a small fraction of its bulk of aqueous liquids, to a protracted aeration treatment, while in the presence of a few percent of alcohol and while in the presence of traces of lime, formaldehyde and ammonia.

6. A process which comprises subjecting petroleum oil material consisting essentially of hydrocarbon, while associated with a minor fraction of its bulk of aqueous liquids and alcohol, to a protracted aeration treatment in the presence of ferment organisms active in oil.

7. A process which comprises sowing ferment organisms in petroleum oil, under conditions favorable to the growth of such organisms, such conditions including the presence of air, and also the addition of small percentages of water and alcohol, the water and alcohol together constituting only a small fraction of the bulk of the said oil.

8. An improvement in treating hydrocarbon oil material having about the boiling point range of kerosene, which comprises subjecting the oil to a protracted aeration treatment in the presence of ferment organisms, and in the presence of water and alcohol, the water and alcohol together constituting only a small percentage of the total volume of said mixture.

9. In the improvement of petroleum oils, the process which comprises exposing said petroleum oils consisting essentially of hydrocarbons to aeration in the presence of water and alcohol while in the presence of ferment organisms active in hydrocarbon oils, the amount of water and alcohol together constituting only a small percentage of the volume of the entire mixture, and the temperature of the mass of material being maintained between 60° F. and 105° F., during such treatment.

HOMER BEHM.